United States Patent
Philippe

(10) Patent No.: US 10,125,831 B2
(45) Date of Patent: Nov. 13, 2018

(54) NO-BACK MECHANISM

(71) Applicant: Ratier-Figeac SAS, Figeac (FR)

(72) Inventor: Jean-Luc Philippe, Planioles (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 15/710,873

(22) Filed: Sep. 21, 2017

(65) Prior Publication Data

US 2018/0142743 A1 May 24, 2018

(30) Foreign Application Priority Data

Nov. 21, 2016 (EP) .................................... 16306522

(51) Int. Cl.
| | |
|---|---|
| *F16D 63/00* | (2006.01) |
| *F16D 65/02* | (2006.01) |
| *F16D 41/02* | (2006.01) |
| *F16D 41/067* | (2006.01) |

(52) U.S. Cl.
CPC ............ *F16D 63/00* (2013.01); *F16D 41/02* (2013.01); *F16D 41/067* (2013.01); *F16D 65/028* (2013.01)

(58) Field of Classification Search
None
See application file for complete search history.

(56) References Cited

U.S. PATENT DOCUMENTS

| | | | |
|---|---|---|---|
| 2,874,579 A | 2/1959 | Geyer | |
| 3,034,365 A * | 5/1962 | Stieber | F16D 7/007 188/218 XL |
| 3,269,199 A | 8/1966 | Deehan et al. | |
| 3,583,248 A | 6/1971 | Langenberg | |
| 6,089,363 A * | 7/2000 | Mimura | F16C 19/00 192/30 R |
| 6,109,415 A | 8/2000 | Morgan et al. | |
| 6,827,183 B1 * | 12/2004 | Polcuch | F16D 65/028 188/134 |
| 6,997,297 B2 * | 2/2006 | Bartley | F16D 63/00 188/82.84 |
| 2017/0184170 A1 * | 6/2017 | Finney | F16D 67/02 |

FOREIGN PATENT DOCUMENTS

| | | |
|---|---|---|
| EP | 0822111 A2 | 2/1998 |
| TW | 332244 B | 5/1998 |

OTHER PUBLICATIONS

European Search Report for Application No. 16306522.0-1762 dated Oct. 27, 2017. 7 pages.

* cited by examiner

*Primary Examiner* — Jacob S. Scott
(74) *Attorney, Agent, or Firm* — Cantor Colburn LLP

(57) ABSTRACT

A no-back brake mechanism or a torque limiter mechanism, comprising a plurality of rollers each mounted within a respective roller cage, the roller cages being articulated about an axis such that rotation of the rollers in a first direction causes no movement of the cages about their axis and rotation of the rollers in a second direction opposite the first direction causes the cages to rotate with respect to their axis.

20 Claims, 3 Drawing Sheets

NO-BACK MECHANISM

FOREIGN PRIORITY

This application claims priority to European Patent Application No. 16306522.0 filed Nov. 21, 2016, the entire contents of which is incorporated herein by reference.

TECHNICAL FIELD

The present disclosure relates to a no-back mechanism such as, but not exclusively, for use in an actuator system such as a horizontal trim stabilizer trim actuator as used e.g. in aircraft.

BACKGROUND

Actuators are used in various applications where there is a need to prevent back rotation due to the force of the load on the actuator. No-back brakes are known in the art e.g. as described in U.S. Pat. No. 2,874,579, U.S. 3,269,199 and U.S. 3,583,248.

Conventional no-back brake mechanisms comprise an arrangement of pawls and ratchets which permit a limited degree of relative axial movement of the actuator components (e.g. a ball screw and brake disk) and the no-brake action depends on friction. Problems can arise in the effectiveness of the no-back brake due to non-ideal coefficients of friction and/or wear of the components. Ratchet wheels and pawls are difficult to manufacture and with conventional carbon disks there is a large dispersion of friction coefficient and surface polishing effects. Ratchets and pawls have to be manufactured to accurate tolerance levels.

One solution to these problems has been to provide an alternative no-back brake mechanism comprising a brake ring comprising an annular frame or cage with openings for a plurality of rollers arranged to determine the overall coefficient of friction of the system. Such a mechanism is described, e.g. in U.S. Pat. No. 6,109,415 which comprises an arrangement of rollers at a skew angle relative to a diameter intersecting the centre of the roller. The skew angles are set and fixed for the desired coefficient of friction and braking effect.

The present disclosure provides an improved no-back brake mechanism that overcomes the disadvantages of conventional mechanisms.

SUMMARY

The disclosure provides a no-back brake mechanism or a torque limiter mechanism, comprising a plurality of rollers each mounted within a respective roller cage, the roller cages being articulated about an axis such that rotation of the rollers in a first direction causes no movement of the cages about their axis and rotation of the rollers in a second direction opposite the first direction causes the cages to rotate with respect to their axis.

Most preferably, the mechanism comprises stop means to prevent rotation of the cages relative to their axis when the rollers rotate in the first direction.

Preferably the mechanism comprises angle stop means to stop rotation of the cages beyond a selected or a predetermined angular position when the rollers rotate in the second direction.

The stop means and angular stop means are optional and the mechanism may include both the stop means and the angle stop means or only one of the stop means and the angle stop means (or, of course, neither).

The no-back (or torque limiter) mechanism preferably comprises the plurality of rollers arranged in a ring configuration defined by the axis of rotation of the roller cages; the mechanism also preferably includes a rotating plate arranged within the ring defined by the axes and in surface contact with the rollers such that rotation of the rollers causes a corresponding rotation of the rotating plate; Preferably, the mechanism further includes a roller functioning as a thrust bearing in surface contact with the rotating plate, the rotating plate positioned between the rollers and the thrust bearing, such that rotation of the rollers causes rotation of the rotating plate which, in turn, causes rotation of the thrust bearing.

The no-back mechanism is preferably mounted in a housing and arranged to cooperate with a rotating system.

In the preferred example, the rotating system comprises a rotating shaft about which is mounted a rotating plate. The rotating plate is in surface contact with the rollers. Rotation of the shaft in the first direction causes corresponding rotation of the plate which induces rotation of the rollers in the first direction. Rotation of the shaft in the second direction causes corresponding rotation of the plate which induces rotation of the rollers in the second direction.

DETAILED DESCRIPTION

Figure 1:
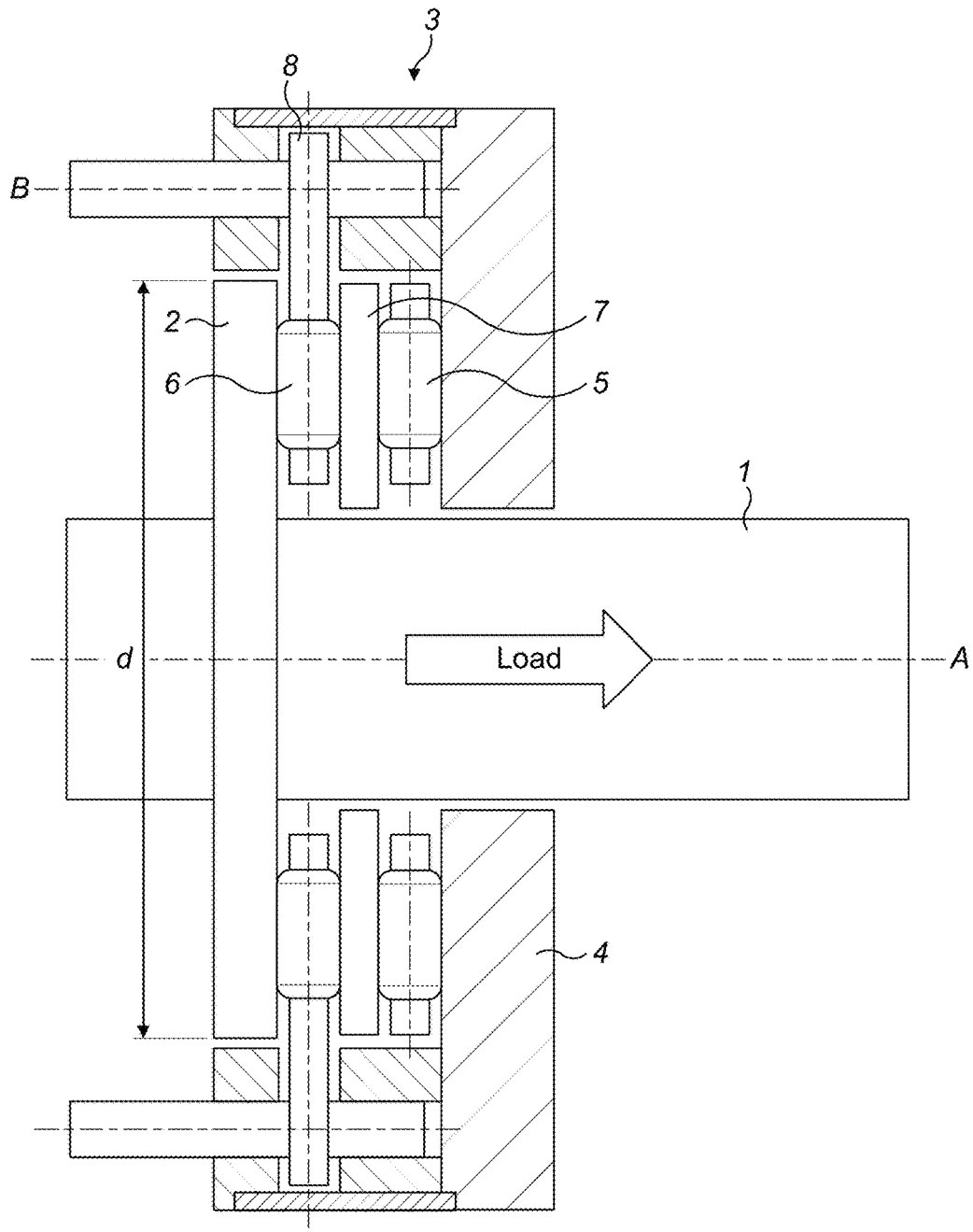
FIG. 1 is a side-sectional view of a rotating system with a no-back mechanism according to the disclosure.

FIG. 1 shows, in side-sectional view, a no-back mechanism acting on a rotating system. The rotating system comprises input shaft 1 which causes rotation of input shaft plate 2 about the input shaft axis A. Input shaft plate 2 has a diameter d. No-back mechanism 3 prevents undesired freewheeling of the plate 2 due to the shaft force. The no-back mechanism is, here, mounted in a housing 4 and comprises a thrust bearing roller 5 mounted about the shaft axis A, a ring configuration of rollers 6 mounted about the shaft axis A and in surface contact with the input shaft plate 2, and a rotating plate 7 mounted to rotate about the shaft axis A and positioned between, and in surface contact with, the rollers 6 and the thrust bearing roller 5.

Each roller 6 is mounted within its own cage 8 each mounted on its own axis B, the axes B of the plurality of cages being arranged in a ring, within the housing 4, the diameter of the ring being greater than that of the input shaft plate 2 such that the cage axes B are radially outwards from the edge of the input shaft plate 2. The cages 8 are mounted to each be rotatable about its own axis B. In a preferred arrangement stops are provided to limit rotation of the cages about their own axes in both directions. These stops are, however, optional.

Operation of the no-back mechanism will be described with reference to FIGS. 2 and 3.

Figure 2:
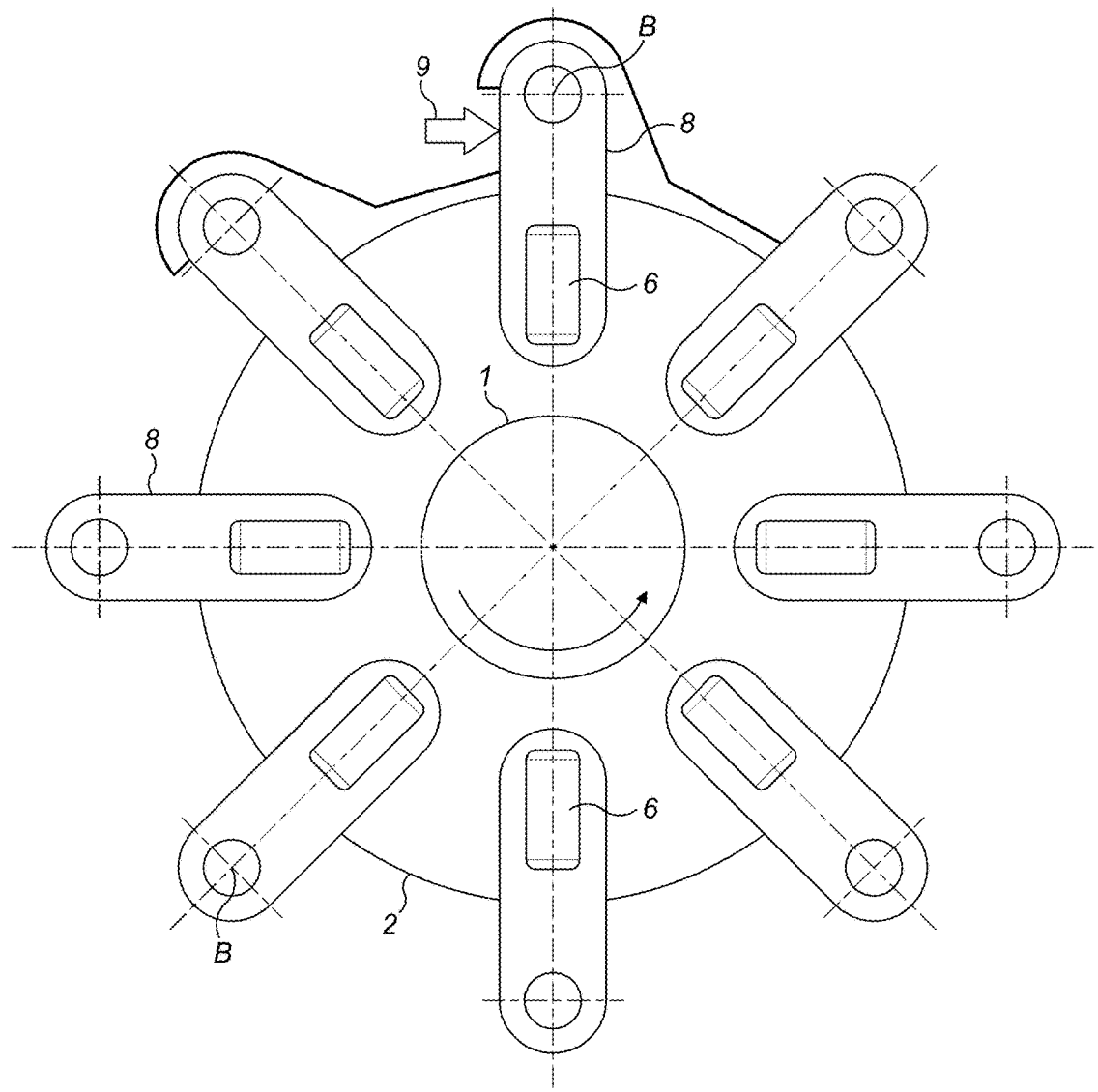
FIG. 2 is a schematic front view of the no-back mechanism such as shown in FIG. 1, on rotation in a first direction.

When the input shaft 1 rotates, and rotates the input shaft plate 2 in a first direction as shown in FIG. 2, the plate causes rotation of the rollers in a first direction, with respect to their cages 8. The cages, however, do not rotate. Rotation may be prevented by a stop 9.

Rotation of the rollers 6 in the first direction causes corresponding rotation of the rotating plate 7 which, in turn, causes rotation of the thrust bearing roller 5. In this situation, therefore, the no-back mechanism is acting effectively as a thrust bearing which minimises torque friction. The input shaft can rotate with only a small level of torque.

Figure 3:
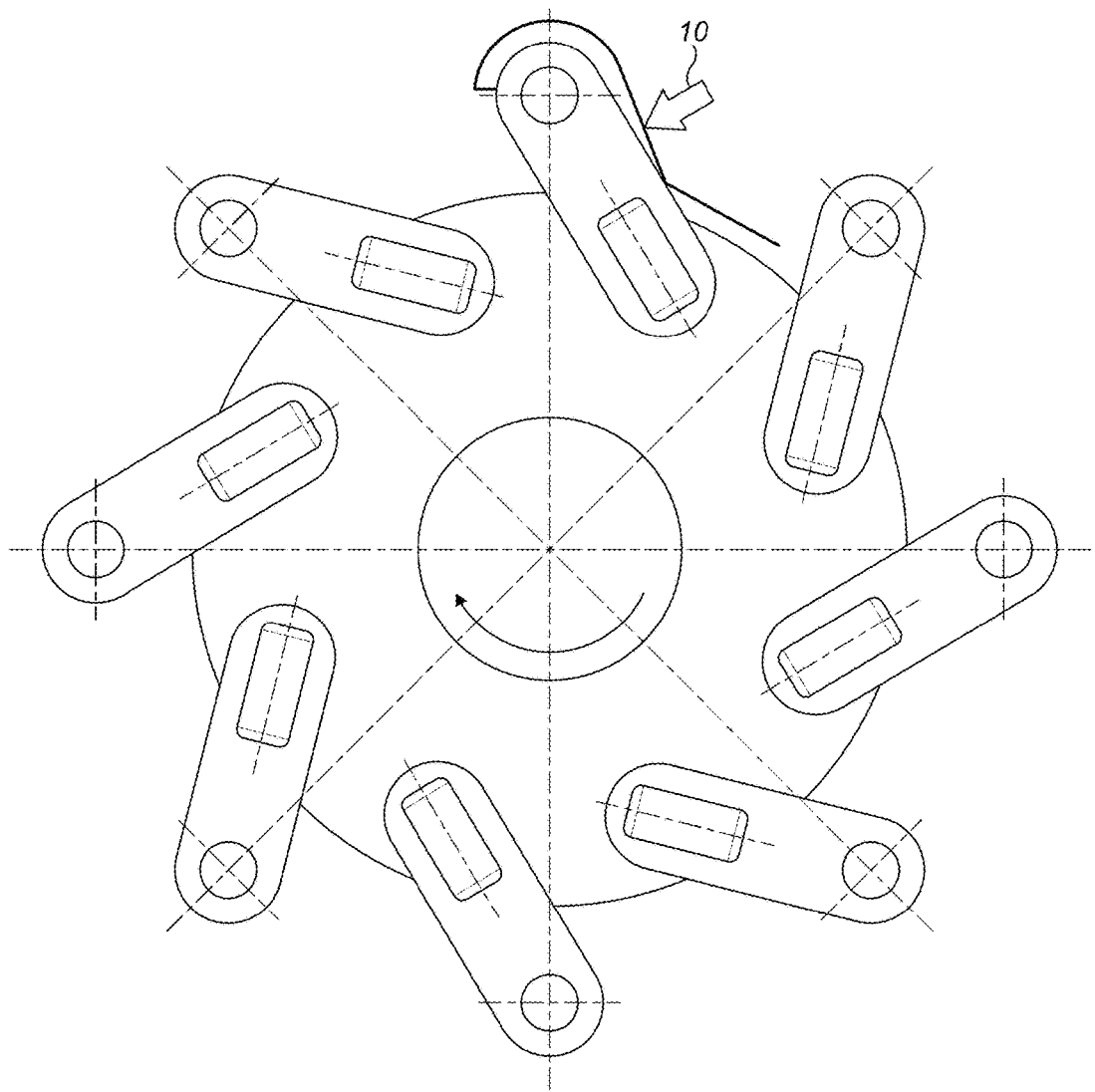
FIG. 3 is a schematic front view of the no-back mechanism such as shown in FIG. 1, on rotation in a second direction.

With reference to FIG. 3, rotation of the shaft 1 in the second direction causes a corresponding rotation of the plate 2 which causes rotation of the rollers 6. In this direction, however, rotation of the rollers causes rotation of their respective cages 8 about their respective axes B creating a friction within the mechanism. The effect in this direction is similar to that of the conventional skewed roller system such as described in U.S. Pat. No. 6,109,415. The friction created absorbs energy or stops the rotation, depending on the input shaft applied torque.

In the second direction, the cages rotate by a given angular degree. The angular position may be limited by an angle stop 10 or can be self-adjusted.

In summary, the adjustable angle of rotation of the cages means that the mechanism acts as a low friction thrust bearing in one direction and as a skewed roller no-back in the opposite direction.

A bi-directional system can be created by providing another no-back mechanism as described above on the other side of the input shaft plate 2 (not shown) to act in a corresponding manner in the event of opposite shaft loading.

The rotation stop 9 could be adjusted to a different angle or eliminated to create an equivalent or different friction level in the other direction of rotation.

The rotation stop 9 and angle stop 10 could be adjustable by a specific device so as to adapt the skewed roller effect to different system conditions.

Angular position sensors (not shown) may be provided on each articulated cage axis to detect no-back failures e.g. due to roller or cage failure.

Unlike the conventional mechanisms, complex and expensive ratchets and pawls are not required.

The concept of the disclosure could also be applied to a torque limiter instead of a no-back brake.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A no-back brake mechanism, comprising:
   a plurality of rollers each mounted within a respective roller cage,
   wherein the roller cages being articulated about an axis such that rotation of the rollers in a first direction causes no movement of the cages about their axis and rotation of the rollers in a second direction opposite the first direction causes the cages to rotate with respect to their axis.

2. The mechanism of claim 1, further comprising stop means arranged to prevent rotation of the cages relative to their axis when the rollers rotate in the first direction.

3. The mechanism of claim 2, wherein the stop means is adjustable.

4. The mechanism of claim 1, further comprising angle stop means arranged to stop rotation of the cages beyond a selected angular position when the rollers rotate in the second direction.

5. The mechanism of claim 4, wherein the angle stop means is adjustable.

6. The mechanism of claim 1, wherein the plurality of rollers is arranged in a ring configuration defined by the axis of rotation of the roller cages.

7. The mechanism of claim 6, wherein the axes of rotation of the roller cages are located on a plate of an input shaft.

8. The mechanism of claim 6, further comprising:
   a rotating plate arranged within the ring defined by the axes and in surface contact with the rollers such that rotation of the rollers causes a corresponding rotation of the rotating plate.

9. The mechanism of claim 8, further including:
   a roller functioning as a thrust bearing in surface contact with the rotating plate, the rotating plate positioned between the rollers and the thrust bearing, such that rotation of the rollers causes rotation of the rotating plate which, in turn, causes rotation of the thrust bearing.

10. The mechanism of claim 1, mounted in a housing and arranged to cooperate with a rotating system.

11. A no-back brake mechanism, comprising:
    a plurality of rollers each mounted within a respective roller cage, wherein the roller cages being articulated about an axis such that rotation of the rollers in a first direction provides a first amount of friction and rotation of the rollers in a second, opposite, direction provides a second, greater amount of friction.

12. An actuator system comprising a rotating system comprises:
    a rotating shaft about which is mounted a rotating shaft plate; and
    a no-back mechanism, the no-back mechanism including:
    a plurality of rollers each mounted within a respective roller cage, wherein the roller cages being articulated about an axis such that rotation of the rollers in a first direction causes no movement of the cages about their axis and rotation of the rollers in a second direction opposite the first direction causes the cages to rotate with respect to their axis;
    wherein the rotating plate is in surface contact with the rollers such that rotation of the shaft in the first direction causes corresponding rotation of the plate which induces rotation of the rollers in the first direction, and rotation of the shaft in the second direction causes corresponding rotation of the plate which induces rotation of the rollers in the second direction.

13. A torque limiter mechanism, comprising:

a plurality of rollers each mounted within a respective roller cage, wherein the roller cages being articulated about an axis such that rotation of the rollers in a first direction causes no movement of the cages about their axis and rotation of the rollers in a second direction opposite the first direction causes the cages to rotate with respect to their axis.

14. The mechanism of claim 13, further comprising stop means arranged to prevent rotation of the cages relative to their axis when the rollers rotate in the first direction.

15. The mechanism of claim 14, wherein the stop means is adjustable.

16. The mechanism of claim 13, further comprising angle stop means arranged to stop rotation of the cages beyond a selected angular position when the rollers rotate in the second direction.

17. The mechanism of claim 16, wherein the angle stop means is adjustable.

18. The mechanism of claim 13, wherein the plurality of rollers is arranged in a ring configuration defined by the axis of rotation of the roller cages.

19. The mechanism of claim 18, wherein the axes of rotation of the roller cages are located on a plate of an input shaft.

20. The mechanism of claim 18, further comprising a rotating plate arranged within the ring defined by the axes and in surface contact with the rollers such that rotation of the rollers causes a corresponding rotation of the rotating plate.

* * * * *